April 14, 1970   D. J. HARRIS ET AL   3,506,915
CALIBRATOR SYSTEM FOR AUTOMATIC NOISE FIGURE INDICATORS
Filed March 14, 1968
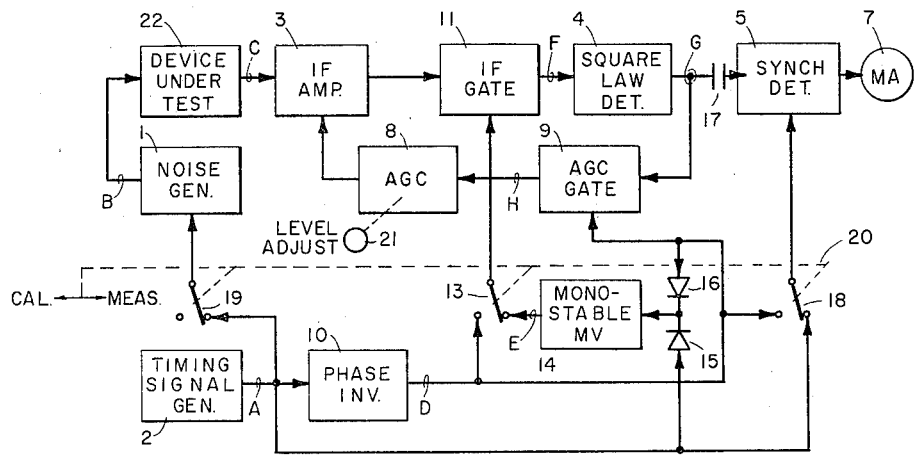
Fig. 1.
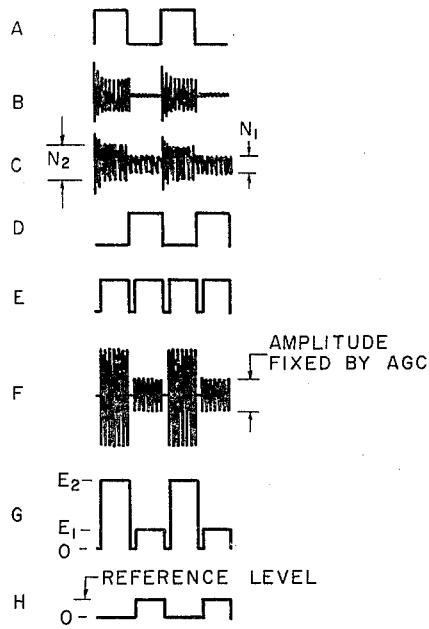
Fig. 2.
Fig. 3.
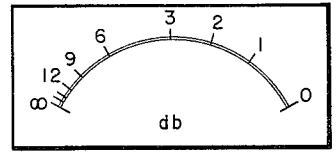
Fig. 4.
INVENTOR.
DAVID J. HARRIS
WILLIAM E. PASTORI
BY
ATTORNEY.

United States Patent Office 3,506,915
Patented Apr. 14, 1970

3,506,915
CALIBRATOR SYSTEM FOR AUTOMATIC NOISE FIGURE INDICATORS
David J. Harris, East Northport, and William E. Pastori, Hicksville, N.Y., assignors to Cutler-Hammer, Inc., Milwaukee, Wis., a corporation of Delaware
Filed Mar. 14, 1968, Ser. No. 713,093
Int. Cl. G01r 27/00; H04b 1/00
U.S. Cl. 324—57                                    3 Claims

ABSTRACT OF THE DISCLOSURE

A noise figure indicator instrument arranged for selective operation in measurement and calibration modes. In measurement, the output of a test device in response to a cyclically pulsed noise source is amplified with automatic gain control to produce two alternately occurring output power levels and the difference between the two levels is indicated in terms of the noise figure of the test device. In calibration, the output is cylically interrupted so as to occur only at the lower of the two levels and is indicated. The scale factor of the instrument is set to make the latter indication correspond to the known excess noise ratio of the noise source to be used.

BACKGROUND OF THE INVENTION

Field

The invention relates to a system for internal or self-calibration of automatic noise figure indicators such as are used for testing radio receivers and amplifiers.

Prior art

Noise figure indicators adaptable for use with the invention are illustrated by the following U.S. patents: 2,620,438, Cotsworth, Dec. 2, 1952; 2,901,696, Mollfors, Aug. 25, 1959.

The above references are the most nearly pertinent prior art presently known to applicant. Both describe noise figure meters in which a noise generator having known or predetermined output power characteristics is cyclically switched on and off, causing the device under test to produce noise output alternately at two different power levels. The noise figure of the test device is determined from a mathematical relationship between the two levels and is indicated on a meter. Neither reference discloses any provision for self calibration or for scale factor setting to accommodate noise generators having different output levels.

SUMMARY

According to this invention, a system is provided for calibrating noise figure indicators of the type that are designed to normalize the two output power levels with respect to a reference level that is simply related to the known excess noise ratio of the noise generator to be used. The difference between the normalized power levels is indicated on a meter which may be calibrated directly in db to indicate the noise figure of the test device.

For calibration, means are provided to make the meter respond to only one of the alternately occurring normalized power levels and not to the other. It can be shown that under this condition the meter should indicate directly in db the known excess noise ratio of the noise generator to be used. The scale factor of the instrument may be set, as by adjustment of the reference level, to produce the correct indication. The scale factor thus set will be correct for subsequent noise figure measurements using that particular noise generator.

BRIEF DESCRIPTION OF THE DRAWINGS

FIGURE 1 is a schematic block diagram of an automatic noise figure indicator system incorporating a presently preferred embodiment of the invention.

FIGURE 2 is a series of graphs representing electrical waveforms occurring at the indicated points in the system of FIGURE 1 during operation in a measurement mode.

FIGURE 3 is a series of graphs illustrating operation in the calibration mode.

FIGURE 4 is a front view of a meter scale for the system of FIGURE 1.

DESCRIPTION OF PREFERRED EMBODIMENT

The automatic noise figure indicator of FIGURE 1 consists basically of a noise generator 1, a timing signal generator 2 arranged to cyclically turn the noise generator on and off, an I-F amplifier 3, and power responsive means comprising a square law detector 4, a synchronous detector 5 and a milliammeter 7. The timing signal may be a square wave of audio frequency, say 1000 hertz. The noise generator may be a gas discharge tube, a temperature limited diode, or any other noise source of suitable known characteristics that can be switched on and off, or between two pretermined output levels.

The amplifier 3 is provided with an automatic gain control 8 which is coupled to the output of detector 4 through a gate circuit 9. Control input to the gate 9 is supplied by a phase inverter 10, which produces an output similar to, but 180° out of phase with the timing signal.

Another gate circuit 11 is connected between the I-F amplifier 3 and the detector 4. This gate is primarily for use in the calibration mode of operation of the system, but also functions in the suppression of undesired transients that may occur in the measurement mode. Control input to the gate 11 is supplied through a selector switch 13 which connects the phase inverter in the calibration mode. In the measurement mode, the switch 13 supplies control input to the gate 11 from a monostable multivibrator 14 designed to produce a brief output pulse in response to the leading edge of each input wave it receives. Inputs are supplied to the multivibrator from both the timing signal generator 2 and the phase inverter 10, through unilaterally conductive diodes 15 and 16 respectively.

The gate circuits 9 and 11 include unilaterally conductive diodes arranged in networks of a known type to act as electrically controlled on-off switches. In the system of FIG. 1, the gates are designed to conduct in response to a positive-going control input signal.

The output of the square law detector 4 is A-C coupled to the signal input circuit of the synchronous detector 5 by way of a capacitor 17. The synchronous detector is a circuit of known type, commonly referred to also as a phase sensitive detector, which produces output of a polarity determined by the relative phase of two signal inputs of the same frequency. Control input to the synchronous erator 2 in the measurement mode. Switches 13, 18 and the timing signal generator 2 in the measurement mode, and from the phase inverter 10 in the calibration mode.

A switch 19 deenergizes the noise generator in the calibration mode, and connects it to the timing signal generator 2 in the measuremnet mode. Switches 13, 18 and 19 are mechanically gauged for single-control operation, as indicated by the dash line 20.

The automatic gain control 8 is of the type wherein the signal to be maintained at a controlled amplitude is compared with a reference level to produce the gain control signal. The reference level can be adjusted by a manually operable control 21.

The meter 7 is provided with a reversed logarithmic scale calibration, as illustrated in FIG. 4. Full scale deflection represents a noise figure of zero db, zero deflection represents an infinite noise figure. To facilitate readings higher than, say 6 db, the meter may be provided with shunts or multipliers and a range selector switch to change its sensitivity in steps.

The test device 22 typically may be simply an amplifier, or it may include several components of a radio receiver, such as R-F amplifier, mixer and I-F amplifier stages. For simplicity of illustration it is assumed that the device 22 is designed to provide output in the passband of the I-F amplifier 3. If the output of the device 22 occurs in some other frequency band, a suitable frequency converter must be provided between it and the amplifier 3.

The noise figure of a device is defined as the ratio of the total noise power available at the output when the input termination is at the standard reference temperature $T_0=290°$ K., to that portion of the total available output noise power originating in the input termination. This definition can be expressed as:

$$F=\frac{N_0}{KT_0BG_d}$$

where
$N_0$ is the available noise output power,
K is Boltzmann's constant,
$T_0$ is 290° K.,
B is the noise bandwidth of the test device, and
$G_d$ is the available power gain of the device.

Owing to the difficulty of making accurate measurements of absolute noise power, the noise figure is usually determined by the so-called Y factor method. The input of the test device is first connected to a termination at room temperature, assumed equal to $T_0$, and a resulting output reference level is established. Then a noise generator with a known output noise temperature is substituted for the room temperature termination. This will cause the output of the test device to increase to a new level. The ratio of the new level to the reference level may be determined easily, as by a direct reading meter or a calibrated attenuator, without any measurement of absolute power. The ratio, referred to as the Y factor, is $$Y=\frac{N_2}{N_1}$$

where $N_2$ is the available noise power output with the noise generator connected and $N_1$ is that with the room temperature termination connected. The noise factor is then:

$$F=\frac{\left(\frac{T_2}{T_0}-1\right)}{Y-1}$$

The quantity in the numerator is called the excess noise ratio (ENR) of the noise generator, and is generally expressed in db:

$$ENR=10\ \log\left(\frac{T_2}{T_0}-1\right)$$

A typical value for an argon gas discharge noise generator would be in the range of 14.5 db to 16.2 db. Most noise generators act as a passive room temperature termination when deenergied and may be simply turned on and off for determination of the Y factor.

For operation of the system of FIG. 1 in the measurement mode, switches 13, 18 and 19 are thrown to the right as shown. The output of the timing signal generator 2, shown in graph A in FIG. 2, alternately energizes and deenergizes the noise generator 1, causing its output to alternate between two known levels defined by the excess noise ratio of the generator, as illustrated by graph B in FIG. 2. Some noise generators employing gas discharge tubes exhibit when energized an initial transient output that exceeds the steady state output level.

The output of the test device 22, shown by graph C in FIG. 2, consists of noise alternating between two levels $N_2$ and $N_1$ in synchronism with the timing signal A. This output is amplified by the amplifier 3. The initial transients present in the amplified output are removed by the gate 11, which is operated to interrupt the primary channel during a brief interval at the beginning of each cycle of the timing wave.

The monostable multivibrator 14 is arranged to provide an output that is normally of the polarity (assumed positive) to make the gate 11 conductive. The multivibrator changes state momentarily in response to each positive-going pulse applied to its input, producing a brief negative going output that makes the gate 11 nonconductive.

The output of the phase inverter 10 is shown by graph D in FIG. 2. The positive going leading edges of this and the timing wave A alternately trip the multivibrator to produce the gate control signal shown by graph E in FIG. 2.

The output of gate 11, with transients removed, is illustrated by graph F in FIG. 2. The resulting output of the square law detector 4, as shown by graph G, alternates between two levels designated $E_2$ and $E_1$. Owing to the square law characteristic of the detector 4, $$E_2=G_sN_2$$

where $G_s$ is the gain of the system from the output of the test device 22 to the output of the detector. Similarly, $$E_1=G_sN_1$$

The gate circuit 9, controlled by the output D of the phase inverter 10, conducts only when $E_1$ is present and rejects $E_2$. The resulting input to the AGC circuit 8 is shown by graph H in FIG. 2. The AGC maintains the gain of the I-F amplifier 3 to keep $E_1$ constant at a level determined by the setting of the level adjustment 21.

The synchronous detector 5 acts as a cyclical reversing switch operating in response to the timing signal A to apply the difference between voltages $E_2$ and $E_1$ to the meter 7.

The effective voltage applied to the meter is $$E_0=E_2-E_1$$

By substitution and rearrangement of terms, $$E_0=G_sN_1\frac{(ENR)}{F}$$

The noise figure may be expressed in db:

$$F_{db}=10\ \log.\ F$$

Since $G_sN_1$ is held constant by AGC action, and ENR is a predetermined known constant, $$F_{db}=K-10\ \log\ E_0$$

where K is a constant:

$$K=10\ \log\ G_sN_1+10\ \log\ (ENR)$$

The constant K is a certain number of db representing the scale factor required to make the meter respond to a net voltage $E_0$ by indicating the corresponding noise figure $F_{db}$.

To enable direct reading use of the instrument with different noise generators having different excess noise ratios, and to provide compensation for changes in calibration that could occur, the constant K may be corrected by adjustment of the AGC level control 21. For making this adjustment, and verifying its correctness, the instrument is operated in the calibration mode by throwing switches 13, 18 and 19 to the left as viewed in FIG. 1.

The alternate energization and deenergization of the noise generator is stopped in this mode, providing a constant level noise input to the test device 22. In the illustrated system, the noise generator remains deenergized. However, it could as well be continuously energized, as long as it is not switched on and off in synchronism with the timing signal. The timing signal is still present, as represented by graph A in FIG. 3, driving the phase inverter 10 to produce the inverted timing signal shown by graph D in FIG. 3.

The I-F gate is controlled by the inverted timing signal so as to conduct only during the negative going half cycles of the timing signal, when the noise generator would be deenergized during operation in the measurement mode. Control of the synchronous detector 5 is transferred from the timing signal to the inverted timing signal. This has the effect of reversing the polarity of the connection of the meter to the synchronous detector. In fact, the switch 18 could be omitted and a reversing switch provided for the meter, if desired.

The output of the test device 22 is substantially constant level noise, as shown by graph C in FIG. 3. After amplification in the I-F amplifier 3, this noise is passed by gate 11 to the square law detector 4 during the periods when the AGC gate 9 is conductive. In the intervening periods, no signal is applied to the detector 4. The input to the detector 4 is illustrated by graph F of FIG. 3, and the resulting output is shown by graph G. The AGC circuit 8 operates in the same way as in the measurement mode to maintain the output of the detector 4 during the negative going half cycles of the timing signal at a constant level, $E_1$.

Owing to the reversal of the sense of response of the meter, and to the fact that $E_2$ is made zero by the action of the I-F gate 11, voltage applied to the meter in the calibration mode is:

$$E_c = E_1 = G_s N_1$$

This voltage causes the meter to show the same indication as it would in the measurement mode under the condition:

$$E_0 = G_s N_1 \frac{(ENR)}{F} = G_s N_1$$

in other words, the condition that:

$$\frac{(ENR)}{F} = 1$$

Accordingly, the meter should indicate:

$$F = ENR$$

If it does not, the factor $G_s N_1$ may be corrected by manual adjustment of the knob 21 to make the meter indicate the known ENR of the noise generator 1. Thereafter the instrument is returned to its measurement mode for direct indication of noise figure.

We claim:
1. A system for automatically indicating the noise figure of a device under test, including a noise generator adapted to produce noise power at predetermined higher and lower levels that are characteristic of the particular noise generator, means including a timing signal generator for controlling said noise generator to produce said noise power alternately at said levels as an input to said device during respective periodic intervals, whereby the noise power output of said device varies periodically between two levels, an amplifier adapted to receive the output of said device and including automatic gain control means connected to an input of said amplifier, power responsive means connected to the output circuit of said amplifier and connected to the input of said gain control means to control the gain of said amplifier in response to at least one of said two levels, whereby the noise power output of said amplifier varies periodically between two levels with respect to a reference level that is fixed in accordance with said higher output power level of said noise generator, said power responsive means including indicator means comprising a synchronous detector controlled by said timing signal and a meter connected thereto to provide a quantitative indication corresponding to the difference between said last mentioned two power levels, wherein the improvement comprises apparatus for calibrating the system including
(a) means responsive to said timing signal intermediate the amplifier output and the power responsive input to interrupt the application of the output of said amplifier to said power responsive means during periodic spaced intervals, whereby the power output of said amplifier varies periodically between zero and a level that is fixed by said automatic gain control means, and
(b) means for adjusting the overall gain between said device under test and said indicator means to effect an indication representing the characteristic higher power level of said noise generator.

2. The invention set forth in claim 1, wherein said means for interrupting the application of the output of said amplifier to said power responsive means is a gate circuit, further including means for producing a control signal adapted to control said gate circuit to be conductive throughout at least a major portion of each half period of said timing signal, and a manually operable switch for selectively applying said last mentioned control signal to said gate circuit in a calibration mode of operation of the apparatus, and applying said timing signal to said gate circuit in a measurement mode of operation of said apparatus.

3. The invention set forth in claim 2, further including means for controlling said gate circuit to be non-conductive during a relatively brief initial portion of each half cycle of the timing signal during operation of the system in its measurement mode.

References Cited

UNITED STATES PATENTS

| 2,408,858 | 10/1946 | Keizer | 324—57 X |
| 2,620,438 | 12/1952 | Cotsworth | 325—363 |
| 2,901,696 | 8/1959 | Mollfors | 324—57 |
| 3,302,116 | 1/1967 | Free | 325—363 |

EDWARD E. KUBASIEWICZ, Primary Examiner

U.S. Cl. X.R.

325—363